(12) United States Patent
Koch et al.

(10) Patent No.: US 7,600,772 B2
(45) Date of Patent: Oct. 13, 2009

(54) APPARATUS FOR COVERING THE TRACK JOINT (TRACK JOINT COVER) BETWEEN THE ROTARY PLATE AND THE BELLOWS OF A CONNECTION BETWEEN TWO HINGE-LINKED VEHICLE SECTIONS

(75) Inventors: Robert Koch, Bad Sooden-Allendorf (DE); Knud Mosaner, Kassel (DE)

(73) Assignee: Hubner GmbH, Kassel (DE)

( * ) Notice: Subject to any disclaimer, the term of this patent is extended or adjusted under 35 U.S.C. 154(b) by 503 days.

(21) Appl. No.: 11/481,609

(22) Filed: Jul. 6, 2006

(65) Prior Publication Data
US 2007/0007795 A1    Jan. 11, 2007

(30) Foreign Application Priority Data
Jul. 9, 2005 (DE) .................... 10 2005 032 218

(51) Int. Cl.
*B62D 63/00* (2006.01)
(52) U.S. Cl. .................. 280/401; 280/402; 280/403
(58) Field of Classification Search .......... 280/401–403
See application file for complete search history.

(56) References Cited

U.S. PATENT DOCUMENTS

| 2,408,473 | A | * | 10/1946 | Nelson | 105/20 |
| 2,843,417 | A | * | 7/1958 | Wahl et al. | 280/403 |
| 5,487,555 | A | * | 1/1996 | Koch et al. | 280/403 |
| 5,546,866 | A | * | 8/1996 | Koch | 105/8.1 |
| 5,884,565 | A | * | 3/1999 | Koch | 105/20 |
| 6,054,194 | A | * | 4/2000 | Kane | 428/12 |
| 6,926,344 | B2 | * | 8/2005 | Koch et al. | 296/178 |
| 7,338,060 | B2 | * | 3/2008 | Koch et al. | 280/403 |
| 7,392,748 | B2 | * | 7/2008 | De Antonio et al. | 105/8.1 |
| 2004/0075239 | A1 | * | 4/2004 | Call | 280/403 |
| 2005/0104321 | A1 | * | 5/2005 | Koch et al. | 280/403 |

FOREIGN PATENT DOCUMENTS

| CH | 346909 | 7/1956 |
| DE | A1 37 07 357 | 3/1987 |
| DE | A1 37 10 407 | 3/1987 |
| DE | A1 40 07 862 | 3/1990 |
| DE | U1 295 09 204 | 9/1995 |
| DE | A1 197 57 429 | 12/1997 |
| DE | 100 05 994 C1 | 4/2001 |
| DE | U1 299 21 498 | 4/2001 |
| EP | B1 0 215 329 | 12/1988 |
| EP | 0 698 514 A1 | 2/1996 |
| JP | 2002187545 A | 7/2002 |

* cited by examiner

*Primary Examiner*—Lesley D Morris
*Assistant Examiner*—Tashiana Adams
(74) *Attorney, Agent, or Firm*—Thomas R. Vigil

(57) ABSTRACT

The invention relates to an apparatus (12) for covering the track joint between the rotary plate (7) and the bellows of the connection (1) between two hinge-linked vehicle sections (3a, 3b), said bellows comprising two side walls (2a) that are joined together through a bellows roof (2c) at least, said track joint cover (12) having, like the bellows of said connection (1), singular corrugations or pleats (13), neighboring corrugations or pleats (13) being joined together by clamping ledges (16) in the region of their one apex at least, and the clamping ledges (16) being fastened at their one end at least to the side wall (2a) of the bellows (2) so as to be vertically movable.

19 Claims, 3 Drawing Sheets

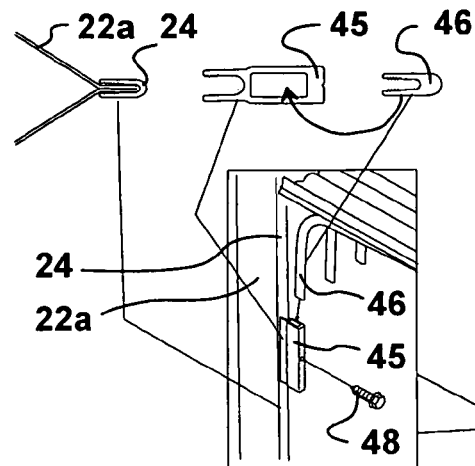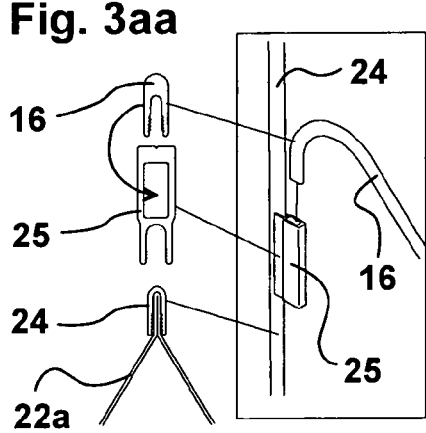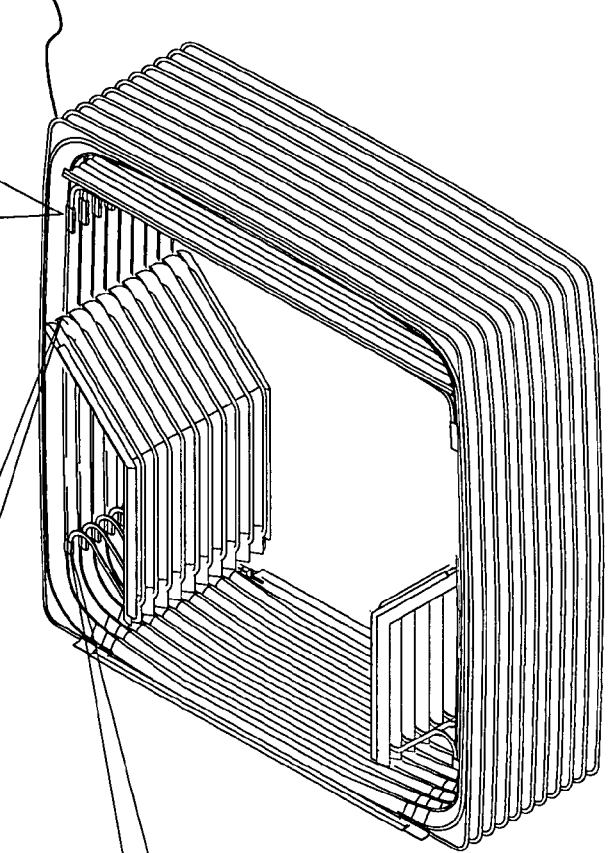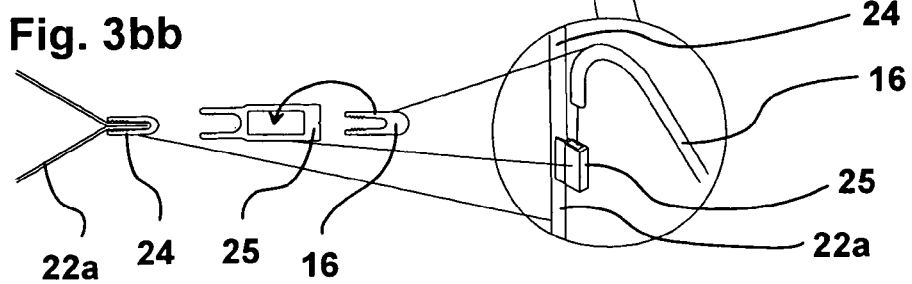

APPARATUS FOR COVERING THE TRACK JOINT (TRACK JOINT COVER) BETWEEN THE ROTARY PLATE AND THE BELLOWS OF A CONNECTION BETWEEN TWO HINGE-LINKED VEHICLE SECTIONS

CROSS-REFERENCE TO RELATED APPLICATIONS

This application claims Priority from German Application No. DE 10 2005 032 218.2-21 filed on 9, Jul. 2005

1. Field of the Invention

The invention relates to an apparatus for covering the track joint (track joint cover) between the rotary plate and the bellows of a connection between two hinge-linked vehicle sections, said bellows comprising two side walls that are joined together through a bellows roof at least, said track joint cover having, like the connection bellows, singular corrugations or pleats, neighboring corrugations or pleats being joined together by clamping ledges in the region of their one apex at least.

2. Description of the Prior Art

With articulated vehicles and here more specifically with articulated buses, tractor and trailer, meaning the two vehicle sections are coupled together through a joint, said joint having a rotary plate also referred to as a vestibule plate. Such a rotary plate makes it possible on the one side to pass from one vehicle section to the other, but also to accommodate additional standing passengers during the travel. This rotary plate is surrounded, together with its joint, by a bellows, more specifically by a pleated bellows, such a bellows usually comprising two side walls that are joined together by a bellows roof at least, a floor being additionally provided so as to provide the connection with a substantially tunnel-like structure.

Between the two side walls and the border of the rotary plate, there is what is termed a track joint, i.e., a space between the two side walls and the rotary plate border that allows for rotation of the rotary plate in the bellows. In order to avoid accidents because of the track joint, it is known to cover said track joint. In this context, a track joint cover shaped like a box in cross section is known from EP 0 215 329 B1; herein the track joint cover consists of singular pleats or corrugations quite similar to those of the connection, with the singular pleats or corrugations being joined together by clamping ledges, said clamping ledges being rigidly disposed on the side wall of the bellows. The clamping ledges of the track joint cover are hereby disposed on, or fastened to, the bellows side wall at the respective apexes of the pleats of the bellows side wall that are immediately adjacent the track joint cover.

It is known that the bellows of an articulated bus for example must be capable of yielding to the most disparate travelling motions. In particular, the bellows must be capable of yielding to all the roll, bending and nodding motions. Roll motions occur, when the two vehicle sections are rotated relative to each other about the longitudinal axis; nodding motions occur, when the bus travels over a hill or through a depression and bending movements occur when the bus negotiates a curve. Usually, the different kinds of movements may also occur simultaneously. This means that high demands are placed on the movability of the bellows.

It has now been found though that the movability of the bellows is quite restricted because of the track joint cover. This is so inasmuch as the bellows is stabilized by the track joint cover, which has a box-shaped contour in cross section; this, as already explained, may strongly compromise the movability of the bellows as such. As a result, the bellows material is subjected to considerable strains, this finally resulting in a reduced durability of the bellows as a whole.

BRIEF SUMMARY OF THE INVENTION

It is therefore the object of the invention to configure an apparatus for covering the track joint between the rotary plate and the bellows of a connection between two hinge-linked vehicle sections in such a manner that the movability of the bellows is not substantially impaired during all of the potentially occurring travelling motions.

In accordance with the invention, the solution to this object is achieved in that the clamping ledges of the track joint cover are fastened at their one end at least to the side wall of the bellows so as to be vertically movable. Through the vertical movability or displaceability of the track joint cover relative to the side wall of the bellows, and through the resulting fact that the track joint cover is floatingly mounted to the bellows, the track joint cover is allowed to move relative to the bellows. This means that the movability of the bellows is not, or only to a small extent, restricted by the track joint cover.

Further advantageous features of the invention will become apparent from the subordinate claims.

In accordance with a particular feature of the invention, there is provided that the clamping ledges are fastened at either end to the side wall of the connection bellows so as to be vertically movable. It is thus made certain that the track joint cover solidly and reliably covers the track joint between the rotary plate and the bellows side wall.

There is further provided, more specifically, that, in the region of their apex turned toward the track joint cover, the pleats or corrugations of the bellows have sheaths for movably receiving the clamping ledges of the track joint cover. It is obvious therefrom that the sheaths, which are preferably disposed in the region of that portion of the bellows side wall that is covered by the track joint cover in order to protect the fixation as a whole from vandalism, displaceably accommodate the clamping ledges.

The sheaths are hereby preferably clampingly connectable to the pleat or the corrugation of the bellows in order to prevent as far as possible deterioration of the bellows material.

In this context, there is provided that the corrugations or pleats have an edging element in the region of their apex, said edging element being for example formed like an edging tape that is bent in a U shape and is glued and/or sewn at the apex to the webs of the corrugations or pleats. Such an edging tape allows preventing the pleated or corrugation bellows material from being damaged when the sheath is fastened to the pleat or the corrugation.

The clamping ledges are pluggable into the sheaths from the top to that the track joint cover is always caused to return to its initial position by virtue of its own weight.

According to another feature of the invention, the track joint cover is fastened to an end frame of each vehicle section. For this purpose, there is more specifically provided that the pleat or corrugation web of a pleat or corrugation neighboring the end frame is clampingly engaged with a strip profile that is receivable by the end frame. While the clamping ledges of the track joint cover are movably attached to the side wall of the bellows, the connection to the end frame of a respective one of the vehicle sections is substantially rigid. This is to prevent the track joint cover as a whole from being removed from the sheaths.

On longer bellows, what is termed a central frame is provided through which the bellows is divided into two halves. In the region of the central frame, the two bellows halves are joined together by the central frame. In this connection, there is provided that the central frame comprises a bar configured to approximately mate with the contour of the track joint cover, said track joint cover being connectable to the bar of the central frame. The bar itself is hereby configured to be a bent part, which is more specifically provided with an open contour, with the ends of the bar being disposed on the central frame. This open, box-type structure of the bar makes it vertically resilient to a certain extent. In order to prevent removal of the track joint cover from the sheaths, the track joint cover is rigidly attached to the bar of the central frame in a manner similar to the way the track joint cover is linked to the end frame of the vehicle chassis. The movability of the bar in the vertical direction still takes into account that the movability of the bellows as such is not, or not substantially, to be hindered by the track joint cover. For connection of the pleat or corrugation web of a pleat or corrugation neighboring the bar, there is again provided a strip profile that clampingly engages the pleat or corrugation web over its length, said strip profile being receivable by the bar. According to another feature of the invention, the bar moreover has a back ledge that mates with the contour of the track joint cover, the strip profile being receivable by said back ledge.

The invention is also directed to the arrangement of a bellows ceiling portion in the region of the bellows roof. There is more specifically provided that the bellows has a bellows ceiling portion which is spaced from the bellows roof to form a cavity, said bellows ceiling portion also comprising a plurality of corrugations or pleats that are joined by clamping ledges in their apex region, said clamping ledges being pluggably receivable by sheaths disposed on the bellows side wall of the connection. This means that the construction for attaching the bellows ceiling portion to the bellows side wall is very similar to the construction for attaching the track joint cover to the bellows side wall. In this case also, there is provided that the sheaths are disposed at the apex of the bellows side wall that is turned toward the bellows ceiling portion for receiving the clamping ledges. Since the bellows ceiling portion is disposed so as to extend substantially directly beneath the bellows roof, with the bellows ceiling portion only slightly rigidifying the bellows side wall, the movability of the bellows will only be restricted to a small extent so that there may be provided, in accordance with another feature of the invention, to fix the clamping ledges in the sheaths, such as by screws.

The invention will be described in closer detail herein after with reference to the drawings.

BRIEF DESCRIPTION OF THE DRAWING

FIG. 2a shows the detail of how the pleat of the track joint cover is attached to the bar of the central frame;

FIG. 2b shows the detail of how the pleat of the track joint cover is attached to the end frames at a respective one of the vehicle sections;

FIG. 3 shows the portion of the bellows between the end frame and the central frame and illustrates how the track joint cover is attached to the bellows;

FIG. 3a shows the detail of how the clamping ledge is attached to the bellows side wall at the top;

FIG. 3aa shows the sheath, the clamping ledge and the pleat of the bellows side wall as shown in FIG. 3a as single component parts;

FIG. 3b shows the detail of how the clamping ledge is attached to the bellows side wall at the bottom;

FIG. 3bb shows the sheath, the clamping ledge and the pleat of the bellows side wall as shown in FIG. 3b as single component parts;

FIG. 3c shows the detail of how the bellows ceiling portion is attached to the bellows side wall;

FIG. 3cc shows the sheath, the clamping ledge and the pleat of the bellows side wall as shown in FIG. 3c as single component parts.

DETAILED DESCRIPTION OF THE INVENTION

Figure 1:
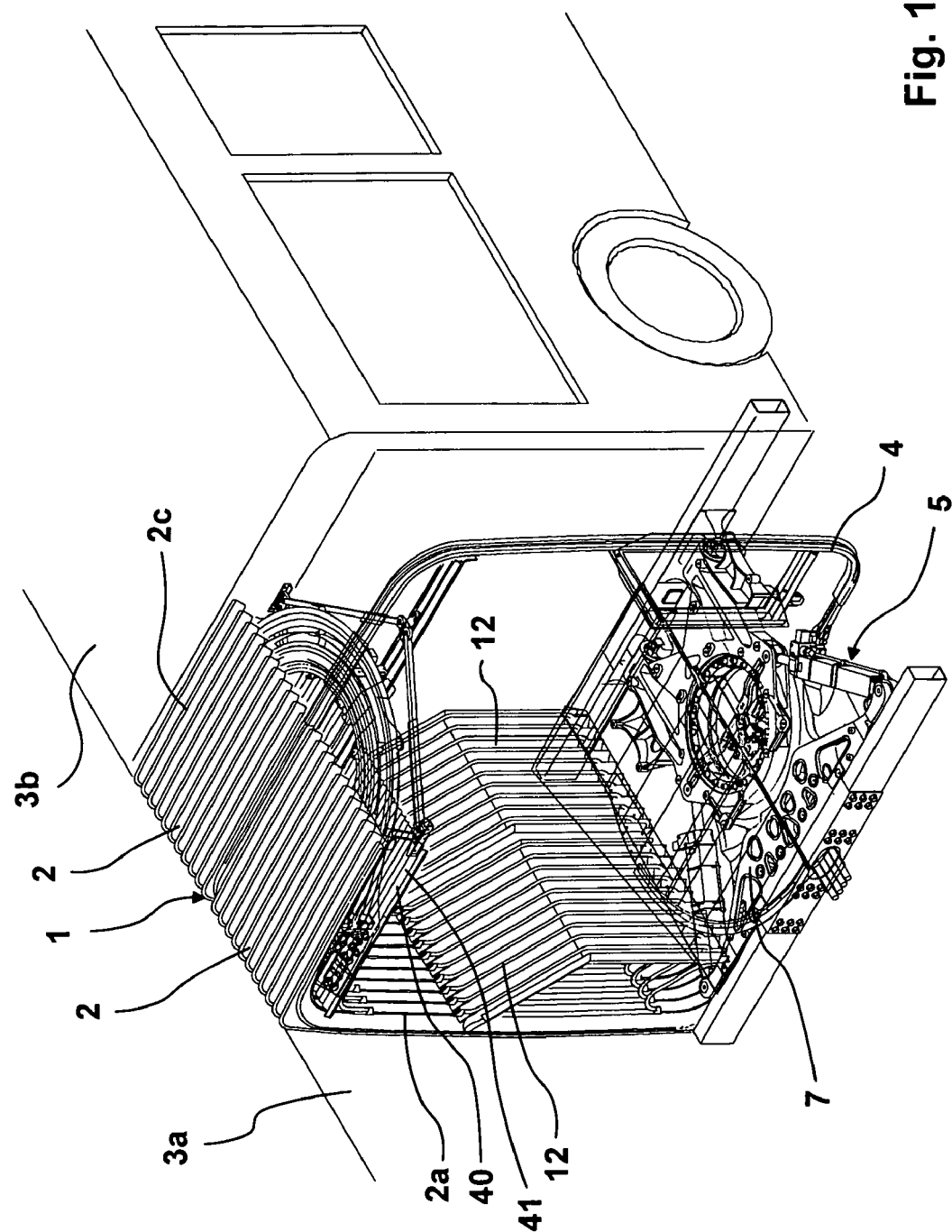
FIG. 1 shows a perspective inside view of a connection with a central frame.

Referring to FIG. 1, the connection is indicated generally at 1. The connection is composed of the two identical bellows halves 2 that are joined together by the central frame 4. At their ends, the bellows halves are fastened to the vehicle parts 3a, 3b. In the region of the two bellows halves 2, there are located the two track joint covers 12 that cover the track joint between the bellows side wall 2a and the rotary plate or the vestibule plate 7. Such a track joint is located on either side of the bellows. Beneath the vestibule plate 7, there is the joint 5. The bellows with the bellows halves 2 is shaped to mate the end side contour of the vehicle sections and also surrounds the joint from the bottom. Consequently, the bellows has a box-shaped cross section. Beneath the bellows roof 2 and at a distance therefrom, there is located the bellows ceiling portion that covers the wiring located beneath the bellows roof.

Figure 2:
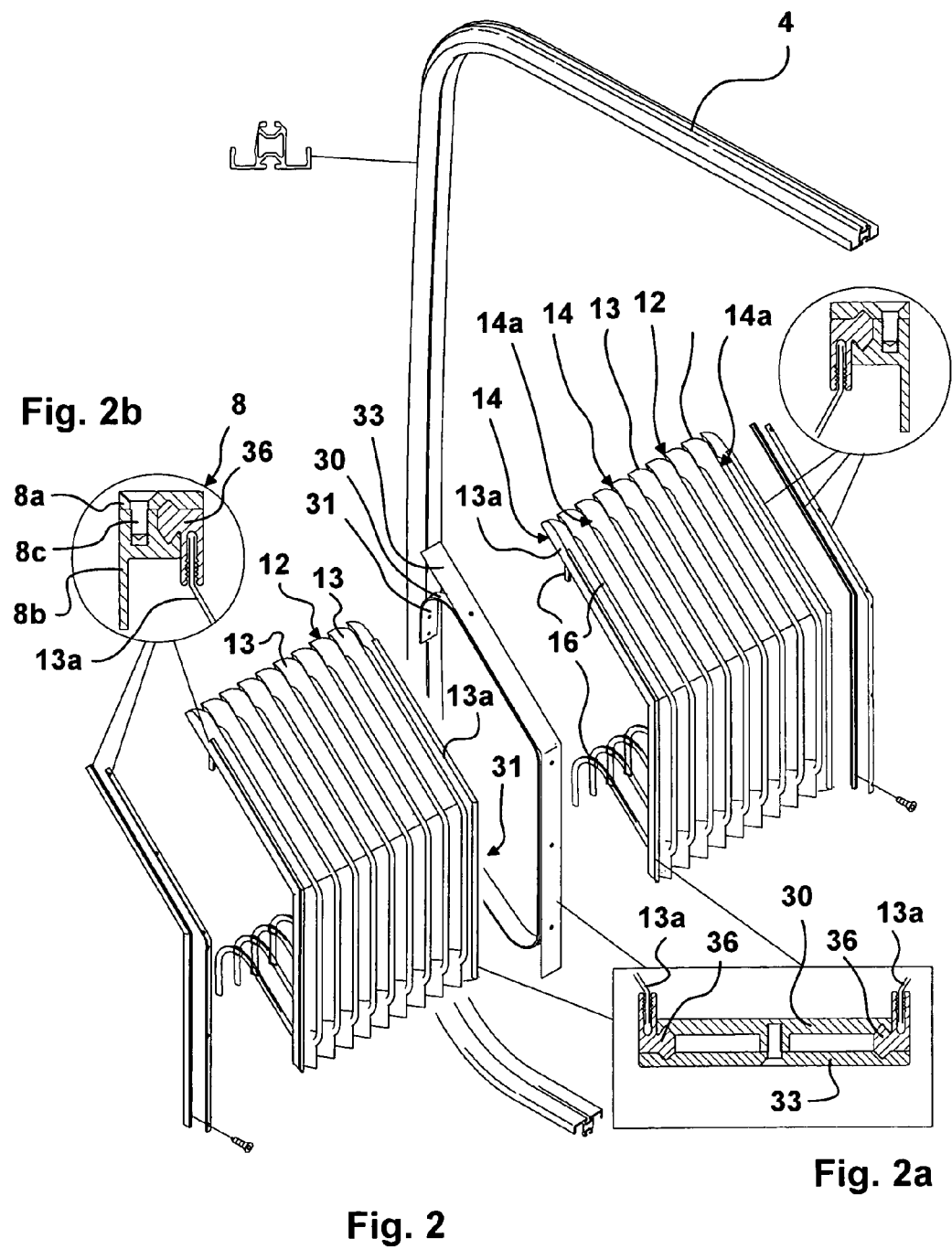
FIG. 2 shows an exploded view of a part of the central frame of a connection, in which there can be seen a track joint cover on either side of the central frame as well as, outlined, the end frames for fixation to a respective one of the vehicle sections, the bellows being removed.

The invention is directed to the way the track joint cover 12 is attached to a respective one of the bellows side wall 2a. In this context, the reader is referred to the FIGS. 2 and 3 and following figures. The track joint cover 12 consists of singular pleats 13, with the pleat webs being joined in the region of the base 14 of the pleat and being retained in the region of the apex 14a of the pleat by what is referred to as a clamping ledge 16. This clamping ledge 16 engages—as already explained—the pleat webs of two neighboring pleats 13 at their apex. In the region of both the upper and the lower end of the track joint cover 12, the clamping ledge 16 between two pleats is angled toward the inside of the track joint cover. The clamping ledge 16 is hereby configured to extend inward so as to form a hook in the lower region of the track joint cover 12 and to thus end at the same height as the upper angled end of the clamping ledge 16 of the track joint cover 12.

Referring now to FIG. 3, the way the track joint cover 12 is fastened to the bellows side wall 2a with the help of the inwardly angled clamping ledges 16 is shown. For details, the reader is thereby referred to the details shown in FIG. 3a and FIG. 3b with the exploded illustration of the component parts shown in the FIGS. 3aa and 3bb. The side wall of the bellows is labelled at 2a. The side wall 2a has a plurality of pleats 22a that are joined together at their outer face by edging frames 23 and are joined inside, i.e., toward the interior of the connection, by an edging tape 24, as can be seen from FIG. 3aa. The sheath 25 is clamped onto the edging tape, with the clamping ledge 16 being insertable into said sheath 25.

A similar implementation with respect to the way the track joint cover 12 is attached to the bellows side wall 2a at the bottom can be seen from the FIGS. 3b and 3bb. Components carried forward from the FIGS. 3a and 3aa are similarly labelled in these two FIGS. 3b and 3bb.

For the attachment of the track joint cover 12 both to the central frame 4 and to the end frames 8 located on the respective vehicle sections 3a, 3b, the reader is again referred to the FIGS. 2, 2a and 2b respectively. Reviewing in this connection the attachment of the track joint cover 12 to the central frame 4, the following appears in connection with FIG. 2a:

In the region of the track joint cover 12, the central frame 4 has the box-shaped, bent bar 30. The box-shaped bent bar 30 has two aligned ends 31 that are screwed to the central frame. On the rear side of the bar, there is the back ledge 33 that mates with the contour of the track joint cover 12. In the neighbourhood of the bar 30 or of the back ledge 33 respectively, the track joint cover 12 has an open pleated bellows web 13a. This open pleat web 13a clampingly engages the strip profile 36, said strip profile 36 being received by the back ledge 33 in connection with the bar, as can be seen from FIG. 2*a*.

With respect to the attachment of the end of the track joint cover 12 to the end frame 8 of the car body, the reader is referred to FIG. 2*b*. The end frame, which is generally indicated at 8, consists of two frame parts 8*a*, 8*b* that are screwable together with the screws 8*c*. In this case the track joint cover 12 again possesses an open pleat web 13*a* in the region of the connection to the car body or to the end frame 8, said web in turn clampingly engaging with the strip profile 36 as this is already known from the description of FIG. 2*a*. This strip profile 36 is received by the end frame 8.

The invention is also directed to the attachment of the bellows ceiling portion 40 to the bellows side walls 2*a*, at a distance from the bellows roof 2*c*. Quite like the bellows itself, the bellows ceiling portion 40 comprises singular pleats 41 that are in turn retained by clamping ledges 46. At their end, these clamping ledges 46 are bent toward the bellows side wall 2*a* where they enter into clamping sheaths 45 as can be seen from FIG. 3*c* and from the exploded view according to FIG. 3*cc*. There is provided that the clamping ledges 46 of the bellows ceiling 40 can be fixed in the sheath 45 by screws 48.

It is absolutely obvious that, when the bellows or the bellows halves move, the track joint cover or the two track joint covers are allowed to move relative to the bellows or to the bellows side wall so that the movability of the bellows is restricted to a small extent only, if at all.

We claim:

1. An apparatus (12) for covering the track joint between the rotary plate (7) and the bellows of the connection (1) between two hinge-linked vehicle sections (3*a*, 3*b*), said bellows comprising two side walls (2*a*) that are joined together through a bellows roof (2*c*) at least, said track joint cover (12) having, like the bellows of said connection (1), singular corrugations or pleats (13), neighboring corrugations or pleats (13) being joined together by clamping ledges (16) in the region of their one apex at least, characterized in that at their one end at least, the clamping ledges (16) are fastened for vertical motion to the side wall (2*a*) of the bellows (2) by the fact that, in the region of their apex turned toward the track joint cover (12), the pleats (13) or corrugations of the bellows (2) have sheaths (25) for movably receiving the clamping ledges (16) of the track joint cover (12).

2. The apparatus as set forth in claim 1, wherein the clamping ledges (16) are fastened at either end to the side wall (2*a*) of the bellows (2) of the connection (1) so as to be vertically movable.

3. The apparatus as set forth in claim 1, wherein the sheaths (25) are disposed in the region of the portion of the side wall (2*a*) of the bellows (2) that is covered by the track joint cover (12).

4. The apparatus as set forth in claim 1, wherein the sheaths (25) are clampingly connectable to the pleat (13) or corrugation of the bellows (2).

5. The apparatus as set forth in claim 1, wherein the clamping ledges (16) are pluggable into the sheaths (25) from the top.

6. The apparatus as set forth in claim 1, wherein the corrugations or pleats (13) have an edging element (24) in the region of their apex.

7. The apparatus as set forth in claim 6, wherein the edging element (24) is an edging tape that is bent in a U shape and is glued and/or sewn to the webs (13*a*) of the corrugations or pleats (13).

8. The apparatus as set forth in claim 1, wherein the track joint cover (12) is fastened to an end frame (8) of a vehicle section (3*a*, 3*b*).

9. The apparatus as set forth in claim 8, wherein a strip profile (36) clampingly engages the pleat or corrugation web (13*a*) neighboring the end frame (8), said strip profile (36) being receivable by the end frame (8).

10. The apparatus as set forth in claim 1, wherein the bellows (2) has a central frame (4).

11. The apparatus as set forth in claim 10, wherein the central frame (4) has a bar (30) configured to approximately mate with the contour of the track joint cover (12), said track joint cover (12) being connected to said bar (30) of said central frame (4).

12. The apparatus as set forth in claim 11, wherein the bar (30) is configured to be a bent part.

13. The apparatus as set forth in claim 12, wherein the bar (30) has an open contour, the ends (31) of said bar (30) being attached to the central frame (4).

14. The apparatus as set forth in claim 11, wherein the pleat or corrugation web (13*a*) neighboring the bar (30) is clampingly receivable by a strip profile (36), said strip profile (36) being receivable by said bar (30).

15. The apparatus as set forth in claim 11, wherein the bar (30) has a back ledge (33) that mates with the contour of the track joint cover (12), the strip profile (36) being receivable by said back ledge (33).

16. The apparatus as set forth in claim 1, wherein the bellows (2) has a bellows ceiling portion (40) which is spaced from the bellows roof (2*c*) to form a cavity, said bellows ceiling portion also comprising a plurality of corrugations or pleats that are joined by clamping ledges (46) in their apex region, said clamping ledges (46) being pluggably receivable by sheaths (45) disposed on the bellows side wall (2*a*) of the connection (1).

17. The apparatus as set forth in claim 16, wherein the sheaths (45) for receiving the clamping ledges (46) are disposed on the apex of the bellows side wall (2*a*) that is turned toward the bellows ceiling portion (40).

18. The apparatus as set forth in claim 17, wherein the clamping ledges (46) are securable in the sheath (45).

19. An apparatus (12) for covering the track joint between the rotary plate (7) and the bellows of the connection (1) between two hinge-linked vehicle sections (3*a*, 3*b*), said bellows comprising two side walls (2*a*) that are joined together through a bellows roof (2*c*) at least, said track joint cover (12) having, like the bellows of said connection (1), singular corrugations or pleats (13), neighboring corrugations or pleats (13) being joined together by clamping ledges (16) in the region of their one apex at least, whereby the clamping ledges (16) are fastened at their one end at least to the side wall (2*a*) of the bellows (2) so as to be vertically movable, and the bellows (2) has a bellows ceiling portion (40) which is spaced from the bellows roof (2*c*) to form a cavity, said bellows ceiling portion also comprising a plurality of corrugations or pleats that are joined by clamping ledges (46) in their apex region, said clamping ledges (46) being pluggably receivable by sheaths (45) disposed on the bellows side wall (2*a*) of the connection (1).

* * * * *